March 24, 1970 R. N. RHODES ET AL 3,502,935

TRANSISTOR DEFLECTION CIRCUITS

Filed May 14, 1965 2 Sheets-Sheet 1

INVENTORS
JOHN BREWER BECK &
ROLAND N. RHODES
BY William A. Meagher
Attorney

March 24, 1970 R. N. RHODES ET AL 3,502,935

TRANSISTOR DEFLECTION CIRCUITS

Filed May 14, 1965 2 Sheets-Sheet 2

INVENTORS
JOHN BREWER BECK &
ROLAND N. RHODES
BY William H. Meagher
Attorney

United States Patent Office 3,502,935

Patented Mar. 24, 1970

3,502,935

TRANSISTOR DEFLECTION CIRCUITS

Roland N. Rhodes and John B. Beck, Indianapolis, Ind., assignors to RCA Corporation, a corporation of Delaware Filed May 14, 1965, Ser. No. 455,736
Int. Cl. H01j *29/70*
U.S. Cl. 315—19 6 Claims

ABSTRACT OF THE DISCLOSURE

Transistorized vertical deflection circuits for a television receiver avoids the use of an electrolytic capacitor as the timing or sawtooth capacitor in the deflection wave generator through use of a "Miller integrator" approach. Sawtooth voltage waveform is developed across capacitor in negative feedback path looped around high gain transistor amplifier. Due to dynamic capacitance multiplying effect, stable yet inexpensive paper capacitor may serve as sawtooth capacitor, since effect of larger capacitor use is realized. Cascaded emitter followers are employed within loop to drive output transistor, and provide exceptionally high input impedance for amplifier, enhancing proper "Miller integrator" action.

This invention relates generally to beam deflection circuits employing transistors and particularly to transistor deflection circuits suitable for serving the vertical deflection function in a television receiver.

In the prior art, efforts to provide a transistorized circuit for energizing the vertical deflection windings of a deflection yoke in a television receiver (of other than very small picture tube size) have failed to provide a satisfactory solution to a basic conflict between component stability and cost economy. The demands of the yoke for a relatively large amount of power at a low frequency (60 cycles), coupled with the relatively low input impedance character of conventional transistors (and the practical economic limits on achieving power gain via successive transistor stages) have heretofore led to the choice of a large-valued electrolytic capacitor as the charging or "sawtooth" capacitor in the deflection wave generator.

However, conventional electrolytic capacitors are notably subject to instability, and their use in the critical deflection wave generation function runs the risk of substantial performance degradation. While the tendency to instability of conventional electrolytic capacitors is avoided to a great extent in the higher grade tantalum capacitors, use of the latter involves considerable expense.

The present invention is directed to a solution to the above-described impasse, whereby the power requirements of the vertical yoke windings may be satisfied by a transistorized deflection circuit employing a relatively inexpensive low-valued capacitor of a stable type (e.g., paper) as the sawtooth capacitor. Achievement of this desired end is made possible through use of the principles of the so-called "Miller integrator" in the transistor deflection circuit configuration. The result is provision of a highly stable, yet economical, vertical deflection circuit, readily amenable to convenient control of the various deflection wave parameters.

A primary object of the present invention is thus to provide a stable, economical transistor deflection circuit capable of satisfying substantial low frequency power requirements.

A further particular object of the present invention is to provide a novel and improved transistorized vertical deflection circuit for a television receiver.

Figure 1:
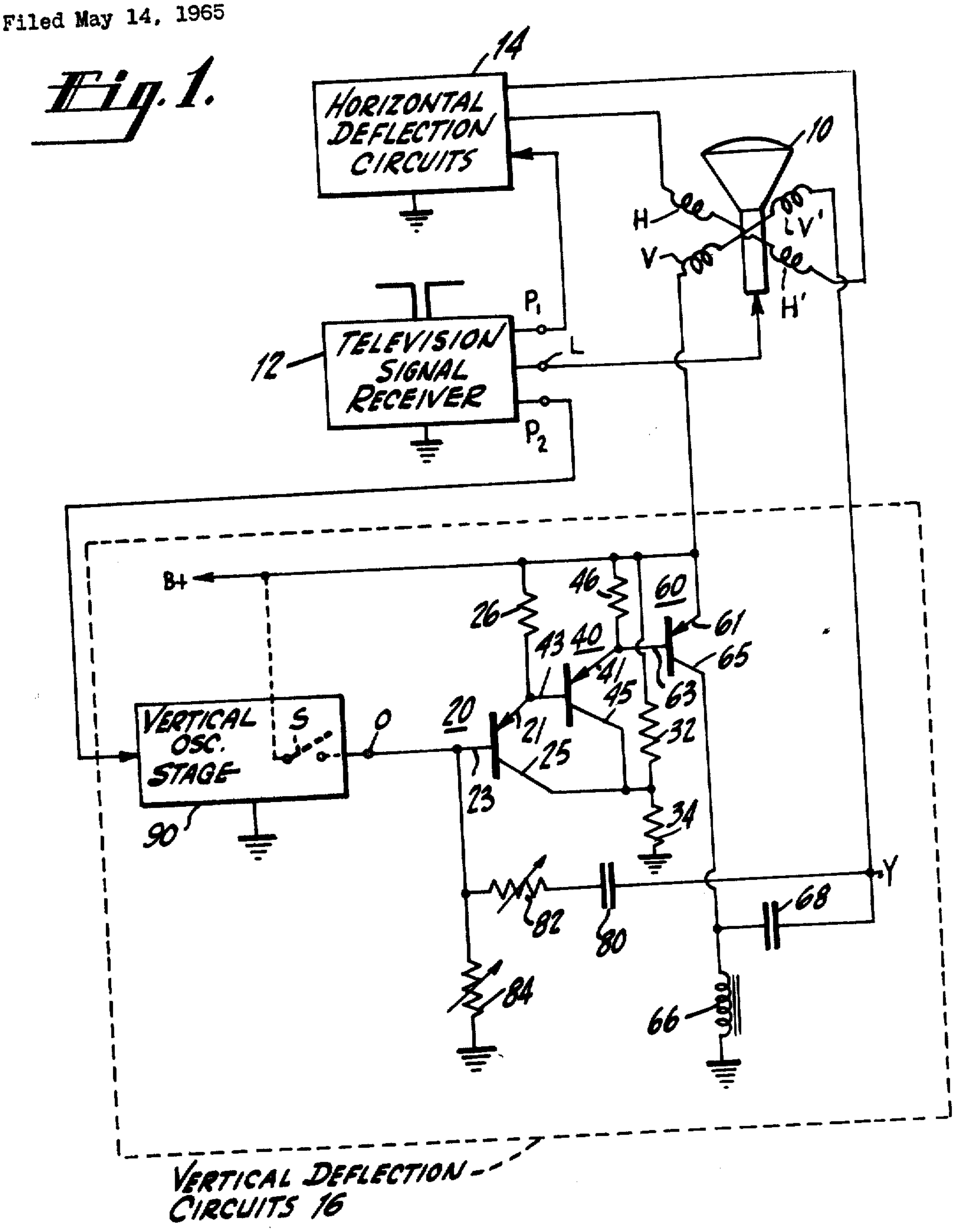
Figure 2:
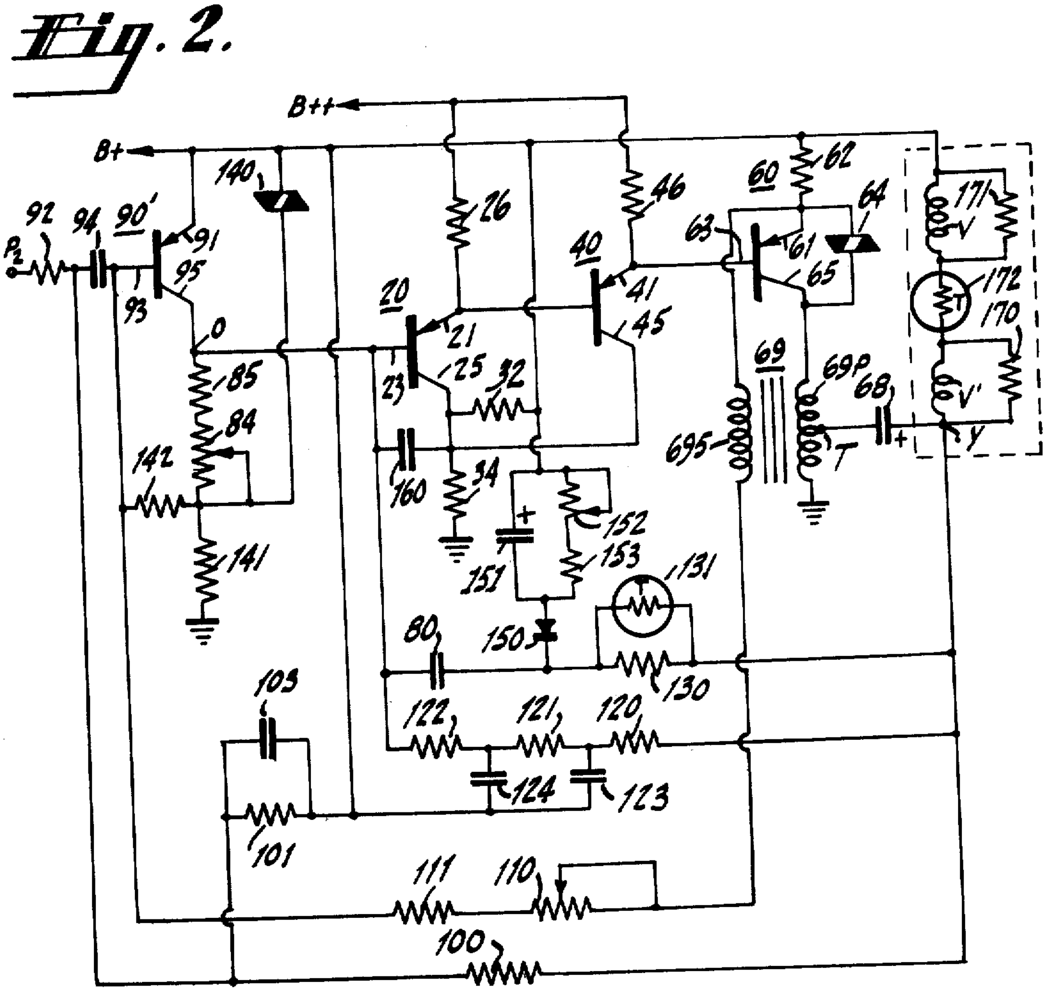

Other objects and advantages of the present invention will be readily recognized by those skilled in the art after a reading of the following detailed description and an inspection of the accompanying drawings in which:

FIGURE 1 illustrates in block and schematic form a television receiver incorporating a transistor deflection circuit embodying the principles of the present invention; and FIGURE 2 illustrates schematically a modification of the embodiment of FIGURE 1.

The process whereby a high gain amplifier with a negative feedback path incorporating a capacitor, serves to integrate an input waveform is described in considerabled detail on pp. 31–37 of vol. 23, entitled "Waveforms," of the M.I.T. Radiation Laboratories Series, published in 1949 by McGraw-Hill Book Co., Inc. Examples of particular tube circuits utilizing this "Miller integrator" phenomenon to generate linear sawtooth voltage waveforms are presented on pp. 37, 196, 197 and 284 of the "Waveforms" volume.

The present invention applies the principles of "Miller integrator" operations to solution of the transistor vertical deflection circuit stability-versus-expense dilemma, previously described. The nature of this application of principles and of the resultant problem solution will be evident from a consideration of the illustrated embodiments.

In FIGURE 1, the bulk of the circuits of a television receiver, serving to provide signals for energizing a picture tube 10, are represented by a single block 12, labelled "television signal receiver." The receiver unit 12 may incorporate the usual elements requisite to provide video signals (at output terminal L) for appropriate intensity modulation of the picture tube's electron beam, as well as to provide suitable synchronizing pulse information (at output terminals $P_1$ and $P_2$) to synchronize, in respective horizontal and vertical deflection circuits 14 and 16, the energization of the respective windings (H, H' and V, V') of the picture tube's deflection yoke.

In the vertical deflection arrangement of FIGURE 1, a sawtooth current waveform is caused to pass through the vertical deflection windings V and V' of the deflection yoke, the windings V and V' being connected in series between a source of unidirectional potential (B+) and yoke input terminal Y. The flow of the desired sawtooth current waveform in the windings, which appear essentially resistive, is in response to the development of a sawtooth voltage waveform at terminal Y. The development of this sawtooth voltage waveform is effected through use of a transistorized arrangement employing the principles of the "Miller integrator."

Transistors 20, 40 and 60 are cascaded to form a high current gain amplifier. Negative feedback is established between the amplifier output and the amplifier input via a path incorporating a capacitor 80. Capacitor 80 is subject to alternate charging and discharging, per switching action of the synchronized vertical oscillator stage 90. The amplifier output voltage waveform (at terminal Y) is a substantially linear sawtooth voltage waveform, per "Miller integrator" principles.

To consider the circuit arrangement and operation in greater detail, it may first be noted that the vertical oscillator stage 90, while not illustrated in schematic detail, but rather shown by block representation, is provided with a symbol of an aspect of its functioning through the dotted line showing of a switch S. The switch S, when closed, connects the oscillator stage output terminal O to the source of B+ potential; when the switch S is open, the output terminal O sees the oscillator stage 90 as an open circuit.

For the purposes of describing the operation of the remainder of the vertical deflection circuit, this switch analogy is adequate in representing the essence of the functioning of stage 90 with respect to the output terminal O. It should be recognized that the opening and closing of switch S occurs on a recurrent basis, properly timed for video signal display purposes through synchronization of the stage operation by the synchronizing pulse information supplied from terminal $P_2$. While the oscillator stage 90 may actually comprise a self-contained oscillator arrangement, such as the familiar blocking oscillator, a preferable arrangement involves establishment of astable multivibrator action between stage 90 and the output yoke-driving stage 60. Details of such an arrangement are not necessary for present purposes, but will be discussed in connection with a subsequent embodiment.

The oscillator stage output terminal O is directly connected to the base electrode 23 of transistor 20. Transistor 20 is arranged in an emitter follower configuration, its emitter electrode 21 being connected via an emitter resistor 26 to the receivers' B+ terminal. Transistor 40 provides a second emitter follower stage, appearing as an emitter load of the transistor 20 emitter follower, the base electrode 43 of transistor 40 being directly connected to emitter electrode 21, and the emitter electrode 41 of transistor 40 being connected via an emitter resistor 46 to the B+ terminal. The collector electrodes 25 and 45 of the two emitter follower stages are jointly connected to an appropriate division point on a low impedance voltage divider connected between B+ and chassis ground; the voltage divider comprises the series combination of resistors 32 and 34, with the collector electrodes connected to the junction of the series resistors.

The output of the cascaded emitter follower stages is applied to the base electrode 63 of output transistor 60, base 63 being directly connected to emitter 41. The emitter 61 of transistor 60 is connected to the B+ terminal. A direct current conductive path between the collector electrode 65 of transistor 60 and chassis ground is provided through a choke 66 (of high AC impedance). An alternating current signal path is also provided between the collector 65 and the emitter 61, this path comprising a DC blocking capacitor 68 in series with the vertical yoke windings V, V'. The aforementioned yoke input terminal Y appears at the junction of blocking capacitor 68 and the yoke winding V'.

Feedback between terminal Y and the base input of transistor 20 is provided via a path comprising capacitor 80 in series with variable resistor 82. An additional variable resistor 84 is connected between the base electrode 23 of transistor 20 and chassis ground.

The nature of the feedback provided via capacitor 80 is negative, since the emitter follower stages 20 and 40 produce no signal phase reversal, whereby only a single phase reversal (i.e., that contributed by stage 60) is provided within the feedback loop.

To appreciate the mode of operation of the illustrated apparatus it may be convenient to first consider the operation assuming the omission of emitter follower stages 20 and 40, i.e., whereby terminal O would be directly connected to the base electrode 63 of output transistor 60. With switch S open, transistor 60 is biased for conduction and a charging circuit for capacitor 80 is established between B+ and chassis ground, the circuit comprising the series combination of resistor 84, resistor 82, capacitor 80, blocking condenser 68 and the conducting output transistor 60. Assuming resistor 84 to be large in resistance value relative to the resistance value of resistor 82, resistor 84 will be primarily determinative of the charging rate. The negative feedback action tends to oppose changes in the potential at terminal O during the charging period, whereby the voltage across resistor 84 varies but slightly; the current therethrough is accordingly relatively constant. A capacitor charging current of such a relatively constant character assures a high degree of linearity of the resultant sawtooth voltage. The charging time constant is effectively larger than that suggested by the physical values of capacitor 80 and resistor 84 due to the dynamic action of the amplifier which multiplies the effective capacitance by a factor dependent upon the amplifier gain.

When switch S is closed, transistor 60 is driven to cut-off, and a discharging circuit for capacitor 80 is completed comprising, in series, the closed switch S, resistor 82, capacitor 80 and the yoke windings V, V'. Resistor 82 is primarily determinative of the discharging rate; with resistor 82 appropriately smaller than resistor 84 per the previous assumption, the discharging time constant is much shorter than the charging time constant.

From the foregoing simplified description, it can be seen that the effect of periodic openings and closings of switch S is to develop across capacitor 80 (i.e., at terminal Y with respect to chassis ground) a substantially linear sawtooth voltage waveform, resulting in the desired sawtooth current waveform flowing through the effectively resistive yoke windings V, V'.

However, it should be appreciated that for the above described type of operations to take place, it is essential that the transistor amplifier present a very high input impedance to terminal O. As a practical matter, while special transistors such as those of the so-called MOS type may inherently present high input impedances, the conventional transistor is a relatively low input impedance device. Thus, if transistor 60 were a conventional transistor and were relied upon as the sole amplifying device within the feedback loop, its relatively low input impedance would deteriorate the capacitor charging action desired. However, by interposing the transistor emitter follower stages between terminal O and the base input of transistor 60, this problem is solved. That is, terminal O now sees a very high input impedance; i.e., the input impedance of an emitter follower, incorporating in its emitter load a further emitter follower, which in turn incorporates in its emitter load the input impedance of transistor 60. The net input impedance presented by this combination is sufficiently large to permit the desired charging action.

The emitter follower stages 20 and 40 also serve to contribute current gain within the negative feedback loop, whereby a high current gain amplifier is realized. The capacitance multiplying effect of the arrangement is thereby enhanced. Reliance on this capacitance multiplying effect provides the solution to the previously described stability-versus-expense dilemma with regard to the sawtooth capacitor choice. The effect of a large valued capacitor is obtained, though the actual capacitor required for use as capacitor 80 may be a relatively small, stable and inexpensive capacitor of the paper type (of a .1 microfarad value, for example).

As indicated by the arrows associated with resistors 82 and 84, these components may desirably be made variable; variable resistor 84, controlling the capacitor charging which occurs during the vertical trace interval, may conveniently serve a manual height control purpose, while variable resistor 82, controlling the capacitor discharging which occurs during the vertical retrace interval, may serve a manual linearity control function.

In FIGURE 2, a modification of the vertical deflection arrangement of FIGURE 1 is illustrated including details with regard to the vertical oscillator stage. Where possible, the same reference numerals employed in FIGURE 1 are re-employed in FIGURE 2 to designate elements of corresponding character and function. The embodiment of FIGURE 2 incorporates a number of features of other copending applications, filed concurrently herewith, as will be indicated in detail subsequently.

It may be observed that the general configuration of the FIGURE 1 embodiment is continued in FIGURE 2, with the emitter follower stage 20 having its base connected to terminal O, its emitter output driving emitter follower stage 40, which in turn drives output transistor stage 60. The yoke windings V, V′ are, as in FIGURE 1, connected in series with a DC blocking capacitor 68 between a B+ point and a point in the collector circuit of the output transistor 60. Yoke input terminal Y, at the junction of capacitor 68 and yoke winding V′ is coupled back to the base electrode 23 of transistor 20 via a negative feedback path including sawtooth capacitor 80. A resistive path between terminal O and chassis ground includes, inter alia, the variable resistor 84.

A starting point for discussion of the departures from and additions to the FIGURE 1 circuit arrangement can appropriately be the vertical oscillator stage for which terminal O is an output terminal. In FIGURE 2, the oscillator stage employs a transistor 90′ having its emitter directly connected to the source of B+, its collector electrode 95 directly connected to terminal O and its base electrode 93 coupled via the series combination of capacitor 94 and resistor 92 to the synchronizing pulse terminal $P_2$. Oscillatory action is obtained as transistor 90′ cooperates with the output transistor stage 60 in the fashion of an astable multivibrator, through the agency of feedback of negative-going flyback pulses generated at terminal Y to the base input of transistor 90′. The path for such flyback pulse application is via a resistor 100 in series with the capacitor 94, the resistor 100 being connected directly between yoke input terminal Y and the junction of resistor 92 and capacitor 94. A parallel RC network comprising resistor 101, shunted by capacitor 103, is coupled between the aforesaid junction and the B+ source, and serves a pulse shaping function, partially integrating the flyback pulse, and discriminating against the undesired feedback of horizontal frequency pulses, which may undesirably be induced in the vertical yoke windings via coupling from the horizontal yoke windings. For an understanding of the multivibrator-like oscillatory action, one should appreciate that the coupling from the transistor 60 collector to the transistor 90′ base via resistor 100 is complemented by the coupling from the transistor 90′ collector to the transistor 60 base via the cascaded emitter follower stages 20 and 40.

Synchronization of the multivibrator type action for ensuring a properly phase display is effected by means of the vertical sync pulse application from terminal $P_2$ to the base of transistor 95. To enhance the accuracy of the synchronization of the timing of vertical deflection wave generation, an additional waveform is fed back to the transistor 90′ base. The source of this waveform is the secondary winding 69S of a transformer 69, the primary winding 69P of which is connected in the collector circuit of transistor 60, in place of the choke 66 of FIGURE 1. Capacitor 68, linking the collector 65 to the yoke input terminal Y, is connected to a tapping point T on primary winding 69P, instead of being connected directly to the collector 65, as was done in FIGURE 1. The tapping down procedure is for impedance matching purposes, which may be required for practical values of yoke and transistor parameters. Where the yoke and transistor parameters are such as not to require impedance matching assistance, the tap may be eliminated and connections made to winding 69P in the same manner as the choke 66 of FIGURE 1.

Integration of the waveform induced in secondary winding 69S provides a voltage of a generally parabolic form, presenting a sharply curving cusp in the vicinity of turn-on time for transistor 90′, at base 93; a resistive path including a variable resistor 110 in series with a fixed resistor 111 cooperates with the capacitance presented at base 93 to provide the integrating action. Adjustment of the resistance value of resistor 110 provides control over the cusp curvature, and therefore provides a convenient vertical hold control, since it is instrumental in determining the timing of the change of state of the multivibrator transistors. For a more detailed discussion of this hold control circuitry, reference may be made to the copending application, Ser. No. 455,730, of James A. McDonald, entitled "Transistor Deflection Control Arrangements" and filed concurrently herewith, and now U.S. Patent No. 3,428,854, issued Feb. 18, 1969.

Also discussed in the above-named copending McDonald application is a further feedback arrangement which is shown in FIGURE 2 as linking yoke input terminal Y to the base electrode 23 of the emitter follower stage 20, such additional feedback path including a trio of resistors 120, 121, and 122 connected in series, in the order named between terminal Y and base 23. A capacitor 123 is connected between the junction of series resistors 120 and 121 and the B+ potential source; an additional capacitor 124 is connected between the junction of series resistors 121 and 122 and the B+ potential source. The effect of this network is to provide a doubly integrated version of the vertical flyback pulse to the input of the feedback amplifier 20–40–60. The furnishing of such a waveform is to effect so called "S-shaping" of the current through the vertical yoke windings V, V′. Such shaping is appropriate, where relatively flat screen picture tubes are employed, since a perfectly linear sawtooth current will not provide a linear raster where the screen curvature does not bear a spherical surface relationship to the beam's deflection center. A more detailed discussion of these points will be found in the aforesaid McDonald application.

In contrast with FIGURE 1 where the Miller feedback path included a manually adjustable resistor in series with the sawtooth capacitor (the adjustable resistor serving a manual linearity control purpose), such control is absent from the feedback path in FIGURE 2. However, there is included in the feedback path, in series with capacitor 80, a resistive network comprising fixed resistor 130, shunted by a thermistor 131. This network provides an impedance for the capacitor discharging circuit which automatically adjusts in value with temperature changes to avoid adverse effects of temperature variations on deflection linearity. Further considerations of this feature will be found in another copending application, Ser. No. 455,685, of James A. McDonald, entitled "Temperature Compensation of Deflection Circuits" and also concurrently filed herewith, and now U.S. Patent No. 3,428,855, issued Feb. 18, 1969. This latter McDonald application also provides an explanation for another feature of the FIGURE 2 circuitry, viz., the return of emitter resistors 26 and 46 to a unidirectional potential source (B++) of greater magnitude than the B+ potential source. Problems of thermal stability are solved by such connections, whereby assurance that transistor 60 will be cut off when transistor 90′ is conducting is provided under most adverse temperature conditions.

In the FIGURE 2 circuitry the height controlling variable resistor 84 is associated in series with a fixed series resistor 85, the latter serving a range limiting function. Moreover the series combination of resistors 84 and 85 returns terminal O, not to chassis ground, but rather to an intermediate point on a voltage divider formed by the series combination of a voltage dependent resistor (VDR) 140 and a fixed resistor 141, the intermediate return point being at the junction of resistors 140 and 141. The purpose of this arrangement is the stabilization of vertical deflection amplitude in the face of such parameter variations as line voltage changes. The base 93 of transistor 90′ is also returned to this intermediate divider point by means of a resistor 142 for bias stabilization purposes. These features are discussed at greater length in the copending application, Ser. No. 455,748, of Todd J. Christopher and James A. McDonald, entitled, "Size Stabilization" and filed concurrently herewith, and now U.S. Patent No. 3,388,285, issued June 11, 1968.

A further feature of the FIGURE 2 circuitry involves the functioning of diode 150. Diode 150 has its cathode electrode directly connected to the junction of sawtooth capacitor 80 and discharge resistor 130; the anode electrode of diode 150 is coupled by means of an RC network to the B+ potential source. The RC network includes a large valued capacitor 151 shunted by the series combination of a variable resistor 152 and a fixed resistor 153. The diode 150 network serves a "jitter" clamp function, forstalling any tendency of the feedback amplifier 20–40–60 to oscillate at a subharmonic of the vertical deflection frequency. The nature of the clamp circuit operation renders variable resistor 152 suitable for serving as a linearity control for the deflection circuit. For further details on this clamp circuit and linearity control arrangement reference may be made to another copending application, Ser. No. 455,682,, of James A. McDonald and Todd J. Christopher, entitled "Deflection Control" and also filed concurrently herewith, now abandoned, and to the continuation thereof, Ser. No. 739,938, filed June 6, 1968. Also discussion in said McDonald et al. application, and the subject of a division thereof, Ser. No. 794,150, filed Jan. 27, 1969, and entitled "Spurious Oscillation Suppression in Transistor Deflection Circuits," is the use of a capacitor 160 coupled between the collector 25 and the base 23 of transistor 20 for suppression of spurious high frequency oscillations. Still another feature of said McDonald et al. application, and the subject of a division thereof, Ser. No. 794,151, filed Jan. 27, 1969, and entitled "Lock-On Prevention in Transistor Deflection Circuits," involves the utilization of a very low valued resistor 62 in the emitter return of transistor 60. In normal operation, the resistance value of resistor 62 is so very low (e.g., less than one ohm) as to have substantially no noticeable effect. However, should receiver turn-on conditions tend to result in the settling of transistor 60 into a highly conducting state approaching saturation, sufficient voltage will be developed across this resistor, and fed back to the base of transistor 90′ (via feedback winding 69S in series with resistors 110 and 111) to initiate the desired multivibrator action.

It will be noted that the details of the yoke shown in FIGURE 2 reveals additional elements 170, 171 and 172 beyond those shown in the FIGURE 1 embodiment. Resistors 170 and 171, individually shunting the respective vertical yoke winding halves V and V′ serve well-known damping functions. Thermistor 172, interposed between the winding halves in the yoke current path serves to stabilize the yoke current amplitude in the face of temperature variations which may affect the effective resistance of the yoke windings, as disclosed in U.S. Patent No. 2,900,564 issued to William H. Barkow on Aug. 18, 1959.

A protection function is served by VDR 64, connected directly in shunt with the collector-emitter path of output transistor 60. The VDR 64 tends to limit the retrace pulse peak developed between collector 61 and emitter 65 when transistor 60 is rendered non-conducting; in its low resistance state under the peak voltage conditions, the VDR 64 bypasses the peak current to a substantial degree, precluding heavy reverse current through the transistor or at a time of high potential so as to avoid possible transistor damage.

By way of example, there is presented in the table below a set of values for the various circuit elements of FIGURE 2, which set of values has proved satisfactory in operation.

Capacitors:
- 68—250 microfarads
- 80—.10 microfarad
- 94—.22 microfarad
- 103—.1 microfarad
- 123—.18 microfarad
- 124—.18 microfarad
- 151—1 microfarad (electrolytic)
- 160—.01 microfarad Resistors:
- 26—220,000 ohms
- 32—330 ohms
- 34—820 ohms
- 46—8,200 ohms Resistors:
- 62—.47 ohm
- 84—65,000 ohms
- 85—56,000 ohms
- 92—8,200 ohms
- 100—8,200 ohms
- 101—3,300 ohms
- 110—25,000 ohms
- 111—6,800 ohms
- 120—22,000 ohms
- 121—33,000 ohms
- 122—47,000 ohms
- 130—3,900 ohms
- 141—7,500 ohms
- 142—470,000 ohms
- 152—100,000 ohms
- 153—27,000 ohms
- 170—820 ohms
- 171—390 ohms Thermistors:
- 131—200,000 ohms at 25° C.
- 172—10 ohms at 25° C.

VDR's:
- 64—30 ma. at 72 volts
- 140—2 ma. at 15 volts

Diode 150—Type FD333

Transistors:
- 20—Type 2501
- 40—Type 2482
- 60—Type 2500
- 90—Type 2502

B+ supply—30 volts

B++—140 volts

What is claimed is:

1. In a television receiver, a vertical deflection circuit comprising the combination of:

a multistage transistor amplifier having an input terminal and an output terminal, said amplifier including an output transistor having an input electrode and an output electrode, said output electrode being coupled to said output terminal, and an emitter follower stage interposed between said input terminal and said input electrode;

a vertical deflection winding coupled to said output terminal;

means for establishing a negative feedback path between said output terminal and said input terminal of said amplifier, said feedback path including a capacitor;

impedance means for connecting said amplifier input terminal to a point of reference potential;

and means, including a semiconductor device connected to said input terminal and subject to periodic switching between conductive and non-conductive states, for subjecting said capacitor to periodically alternating charging and discharging actions.

2. In a television receiver, a vertical deflection circuit comprising the combination of:

a multistage transistor amplifier having an input terminal and an output terminal, said amplifier including an output transistor having an input electrode and an output electrode, said output electrode being coupled to said output terminal, and a pair of emitter follower stages in cascade interposed between said input terminal and said input electrode;

a vertical deflection winding coupled to said output terminal;

means for establishing a negative feedback path between said output terminal and said input terminal of said amplifier, said feedback path including a capacitor;

impedance means for connecting said amplifier input terminal to a point of reference potential;

and means, including a semiconductor device connected to said input terminal and subject to periodic switching between conductive and non-conductive states, for subjecting capacitor to periodically alternating charging and discharging actions.

3. In a television receiver, a vertical deflection circuit comprising the combination of:

a multistage transistor amplifier having an input terminal and an output terminal, said amplifier including an output transistor having an input electrode and an output electrode, said output electrode being coupled to said output terminal, and a pair of emitter follower stages in cascade interposed between said input terminal and said input electrode;

a vertical deflection winding coupled to said output terminal;

means for establishing a negative feedback path between said output terminal and said input terminal of said amplifier, said feedback path including a capacitor in series with a first variable resistor;

impedance means including a second variable resistor for connecting said amplifier input terminal to a point of reference potential;

and means, including a semiconductor device connected to said input terminal and subject to periodic switching between conductive and non-conductive states, for subjecting capacitor to perir lically alternating charging and discha ging actions.

4. In a television receiver, a vertic l deflection circuit comprising the combination of:

a multistage transistor amplifier having an input terminal and an output terminal, said amplifier including an output transistor having an input electrode and an output electrode, said output electrode being coupled to said output terminal, and a pair of emitter follower stages in cascade interposed between said input terminal and said input electrode;

a vertical deflection winding coupled to said output terminal;

means for establishing a negative feedback path between said output terminal and said input terminal of said amplifier, said feedback path including a capacitor in series with a first variable resistor;

impedance means including a second variable resistor for connecting said amplifier input terminal to a point of reference potential;

a transistor device subject to periodic switching between conductive and non-conductive states;

and means including a connection between said device and said input terminal for alternately permitting charging of said capacitor through said impedance means when said transistor device is in a non-conductive state and discharging said capacitor through said transistor device when said transistor device is in a conductive state;

said first variable resistor providing means for adjusting deflection linearity via control of the capacitor discharging time constant, and said second variable resistor providing means for adjusting deflection amplitude via control of the capacitor charging time constant.

5. In a transistorized television receiver including a display device and a vertical deflection winding requiring field rate sawtooth wave energization at a predetermined power level in order to develop a display raster of the height required by said display device, energizing circuitry for said winding comprising the combination of:

(A) a high-stability capacitor of dry, non-electrolytic form having a capacitance value of a first order of magnitude;

(B) means for utilizing said capacitor as the timing condenser in the development of field rate sawtooth waves for energization of said winding;

said utilizing means comprising the combination of:

(1) a transistor amplifier having an input terminal and an output terminal and providing power gain therebetween of a predetermined magnitude;

(2) a source of unidirectional potential;

(3) resistive impedance means;

(4) a transistor device subject to periodical switching between conductive and nonconductive states;

(5) means independent of said transistor amplifier for connecting the series combination of said transistor device and said resistive impedance means across said source of unidirectional potential;

(6) means for establishing a negative feedback path between said output terminal and said input terminal of said amplifier, said negative feedback path including said high-stability capacitor; and (7) means, including a connection between said input terminal and the junction of said transistor device and said resistive impedance means, for alternately permitting charging of said capacitor through said resistive impedance means when said transistor device is in a non-conductive state and discharging of said capacitor through said transistor device when said transistor device is in a conductive state;

and wherein the magnitude of gain provided by said transistor amplifier is such that the effective capacitance of said capacitor for said charging action is a predetermined multiple of said capacitance value, with said multiplied capacitance value being of a higher order of magnitude than said first order of magnitude and so related to the resistance value of said resistive impedance means as to provide a charging time constant appropriate to said field rate of required energization and to provide a level of sawtooth wave development at said input terminal which is adequate for development by said transistor amplifier at said output terminal of winding energization power at said predetermined level; and (C) means for coupling said vertical deflection winding to said output terminal.

6. Apparatus in accordance with claim 5 wherein said high-stability capacitor comprises a paper capacitor having a capacitance value less than one microfarad.

References Cited

UNITED STATES PATENTS

| | | |
|---|---|---|
| 3,178,593 | 4/1965 | Diehl. |
| 3,221,269 | 11/1965 | Davies. |
| 3,229,151 | 1/1966 | Attwood. |
| 3,247,419 | 4/1966 | Attwood. |
| 3,275,847 | 9/1966 | Kitchin. |

RODNEY D. BENNETT, Jr., Primary Examiner

BRIAN L. RIBANDO, Assistant Examiner